Jan. 22, 1952     H. N. STEPHAN     2,583,065
CLUTCH OPERATING MECHANISM
Filed Feb. 25, 1948     3 Sheets-Sheet 1
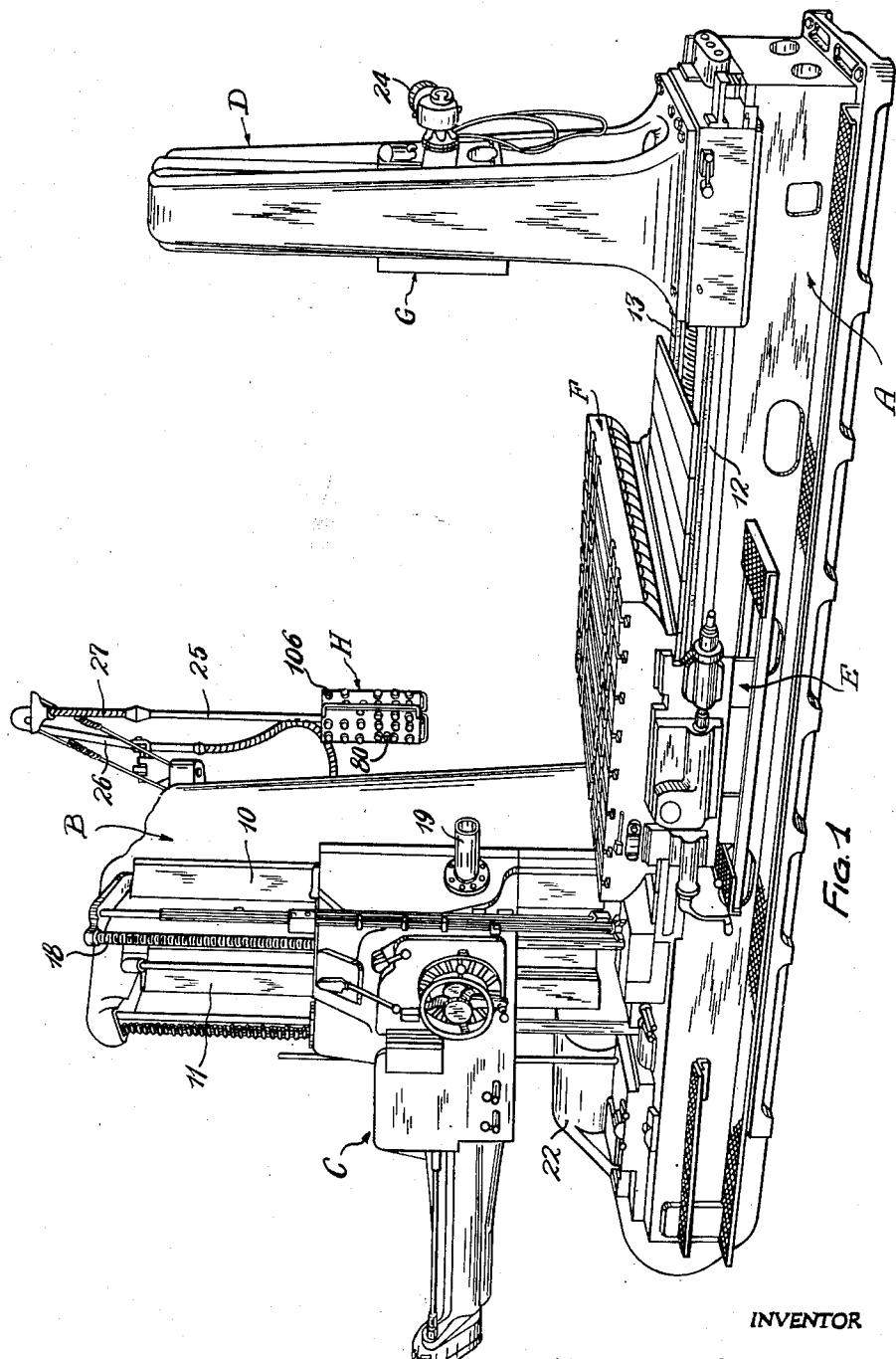
INVENTOR
HALLIS N. STEPHAN
Kwis, Hudson, Boughton & Williams
ATTORNEYS Jan. 22, 1952    H. N. STEPHAN    2,583,065
CLUTCH OPERATING MECHANISM
Filed Feb. 25, 1948    3 Sheets-Sheet 2
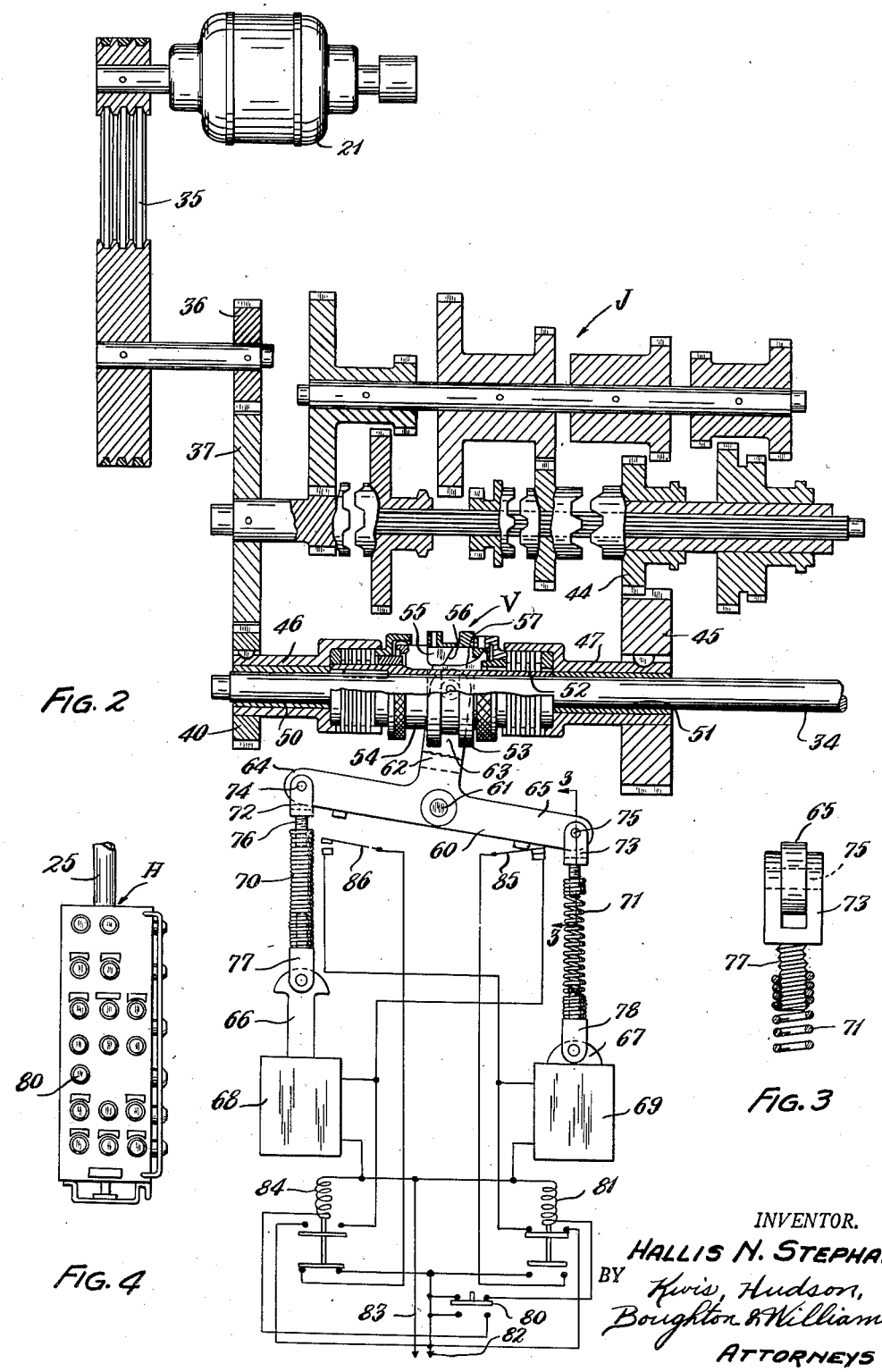
INVENTOR.
HALLIS N. STEPHAN
BY Kivis, Hudson,
Boughton & Williams
ATTORNEYS

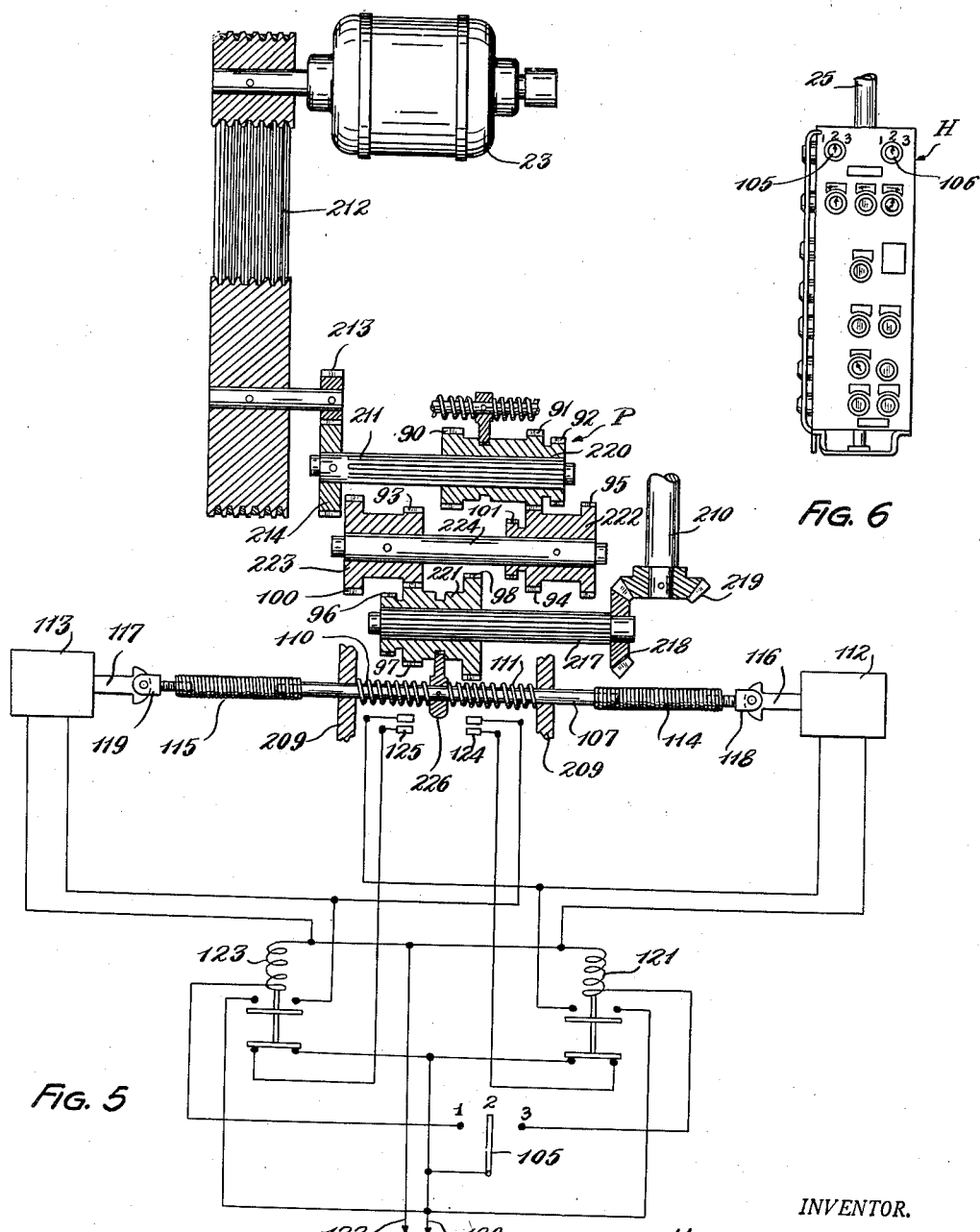

Patented Jan. 22, 1952

2,583,065

UNITED STATES PATENT OFFICE 2,583,065

CLUTCH OPERATING MECHANISM

Hallis N. Stephan, Cleveland Heights, Ohio, assignor, by mesne assignments, to The New Britain Machine Company, New Britain, Conn., a corporation of Connecticut Application February 25, 1948, Serial No. 10,615

6 Claims. (Cl. 74—365)

The present invention relates to electrically actuated or controlled means for shifting or moving machine parts, such as the movable element or elements of a clutch, either friction or jaw, or the movable element or elements of a sliding gear speed change transmission and to machine tools, especially horizontal boring, drilling and milling machines embodying such mechanism.

The principal object of the invention is the provision of novel and improved, electrically actuated or controlled mechanism for moving or shifting a movable member, such as the movable element or elements of a clutch, the movable element or elements of a sliding gear speed change transmission, etc., which mechanism will be reliable and comparatively silent in operation and which will not subject the various parts to undue shock and strain, etc., and will otherwise be more satisfactory than devices heretofore employed for like purposes.

Another object of the invention is the provision of a novel and improved, electrically actuated or controlled mechanism including a solenoid for moving or shifting a movable member, such as the movable element or elements of a clutch, the movable element or elements of a sliding gear speed change transmission, etc., wherein the mechanical connection between the solenoid and the member moved thereby includes a tension spring, which spring collapses to form a rigid column when the solenoid is deenergized.

Another object of the invention is the provision of a novel machine tool, such as a horizontal boring machine, comprising a power transmission device including a disengageable drive connection, such as a clutch, either friction or positive drive, or a sliding gear speed change transmission, and an electric solenoid means for moving the movable element or elements to engage or disengage the drive, etc., and wherein the mechanical connection between the solenoid and the member moved thereby includes a tension spring, which spring collapses to form a rigid column when the solenoid is deenergized.

Another object of the invention is the provision of novel, electrically operated or controlled means for shifting a movable device, such as a change gear, into either of three positions.

The present invention resides in certain details of construction and combinations and arrangements of parts, and further objects and advantages thereof will be apparent to those skilled in the art to which the invention relates from the following description of the preferred embodiment thereof described with reference to the accompanying drawings forming a part of this specification, in which similar reference characters designate corresponding parts, and in which Fig. 1 is a perspective view of a horizontal boring, milling and drilling machine embodying the present invention;

Fig. 2 is a diagrammatic view of the spindle head, table, and saddle feed and rapid traverse transmission of the horizontal boring machine shown in Fig. 1;

Fig. 3 is an enlarged, fragmentary, sectional view, with portions in elevation, approximately on the line 3—3 of Fig. 2;

Fig. 4 is a front elevational view of the pendant control station;

Fig. 5 is a diagrammatic view of the spindle speed change transmission of the horizontal boring machine shown in Fig. 1; and Fig. 6 is an elevational view of the right-hand side of the pendant control station shown in Figs. 1 and 4.

While the present invention is susceptible of general application, it is particularly applicable to electrically controlled machine tools, such as the pendant controlled horizontal boring machine shown in United States patent to Lucas, et al., No. 2,208,312, issued July 16, 1940, and is herein shown and described as embodied in such a machine. Only those parts of the machine which are necessary to a complete understanding of the present invention are herein shown and described. Reference is made to the aforesaid patent for a complete disclosure of the other parts of the machine. Where possible, the same reference characters are used to facilitate reference to the patent.

Referring to the drawings, the machine shown therein comprises a base A provided at one end with a spindle head column B having vertical ways 10 and 11 on the front face thereof, upon which ways a spindle head C is mounted for vertical movement. At the other end of the base or bed A, a backrest or outboard support column D is provided. This backrest or outboard support column is slidably supported on horizontal ways 12 and 13 formed on the upper side of the bed. The ways 12 and 13 also have slidably supported therein a saddle E, the upper side of which is provided with horizontal ways which in turn support a work table F. A backrest block G is slidably supported for movement along vertical ways formed on the backrest column. The spindle head C which is counterbalanced by a weight (not shown) is adapted to be moved vertically along the ways 10 and 11 by a lead screw 18 rotatably supported in the base A and the spindle head column B and having threaded engagement with a nut fixed in the spindle head. The spindle, designated generally by the reference character 19, in addition to being rotatable in opposite directions, is movable in opposite directions longitudinally of its axis to effect both feeding and rapid traversing movements.

The speed and direction of rotation of the spindle, etc., and the different movements of the various elements, such as the feed and rapid traverse of the spindle, head, saddle, table, etc., are performed by power and their operation may be controlled from any convenient place about the machine. In the embodiment of the invention shown, five electric motors are employed to perform the various movements or operations as follows: a reversible motor 21, commonly referred to as the feed and rapid traverse motor, supported on the bed within a guard 22 adjacent to the left-hand end of the machine; a reversible main driving motor 23 arranged for ceiling mounting, also enclosed within the guard 22; a spindle rapid traverse, reversible motor (not shown) mounted on the head C; a reversible motor 24 for clamping and releasing the backrest block; and a reversible motor (not shown) for moving the backrest column D.

The feed and rapid traverse motor 21 is connected to the saddle and table feeding and rapid traversing mechanism and to the spindle head and backrest raising and lowering mechanism. The motor 23 is connected to the spindle rotating and feeding mechanism, and the spindle rapid traverse motor actuates the rapid traverse for the tool spindle. The motors are adapted to be selectively connected to the various operating elements through the medium of suitable speed change transmissions, shafts, gears, clutches, etc., the controls for which are located on or adjacent to the base A, spindle head C, and/or pendant control station H fixed to the lower end of a pipe 25 connected to a universally movable arm 26 by a flexible cable 27.

The shaft 34 to which the spindle head, saddle, and table operating mechanisms are adapted to be selectively connected in the manner disclosed in the aforesaid patent is adapted to be driven in either direction depending upon the direction of rotation of the motor 21 at different comparatively low feed rates through a speed change transmission J or at a high rapid traverse rate. The electric motor 21 is operatively connected to the transmission J by a V-belt drive 35 and spur gears 36 and 37. The gear 37 is selectively connected to the shaft 34 to rotate the same at a relatively high rate of speed through a gear 40 and the normally disengaged, left-hand side of a double friction clutch V. The speed change transmission J is selectively connected to the shaft 34 through the gears 44, 45 and the normally engaged, right-hand side of the friction clutch V. Reference to the aforesaid patent will show that the mechanism employed therein for connecting the gears 37, 44 to the shaft 34 is herein replaced by the gears 40, 45 and the double friction clutch V.

The clutch V shown is of commercial construction and is a "Maxitorq" floating disk, self-locking, double clutch sold by The Carlyle Johnson Machine Company, 52 Main Street, Manchester, Connecticut, and is shown in Sweet's File for Product Designers, 1944, to which reference is made for a more complete disclosure thereof, if necessary. The clutch comprises left and right-hand driving cups or hubs 46, 47 rotatably supported by means of bushings 50, 51 on the shaft 34 and to which driving cups the gears 40 and 45 are keyed. The driving cups 46, 47 are operatively connected to the left and right-hand series of driving disks, respectively. The left and right-hand series of driven disks are keyed to a sleeve 52 extending between the bushings 50, 51 and keyed to the shaft 34. The construction is such that when the left-hand side of the clutch is engaged, the sleeve 52 and, in turn, the shaft 34 is driven from the gear 40 through the driving cup 46 and when the right-hand side of the clutch is engaged, the sleeve 52 and, in turn, the shaft 34 are driven from the gear 45 through the driving cup 47.

Opposite sides of the double clutch V are adapted to be selectively engaged by the shifting of a sleeve member 53 slidably supported on the clutch body 54 and provided with two series of inwardly extending lugs 55 projecting into suitable slots in the body member 54 and each provided with an inclined cam surface 56. Each of the two series of lugs are spaced axially with respect to each other and face in opposite directions. The construction is such that as the sleeve member 53 is shifted to the right or to the left from its normal intermediate position with both sides of the clutch disengaged, the cam surfaces 56 on one series of lugs 55 engage one set of levers or members 57 and move the same to engage one side or the other of the clutch depending upon which direction the sleeve 53 is moved. After the sleeve member 53 has been moved a sufficient distance to engage one side or the other of the clutch, continued movement thereof causes the radial inner ends of the lugs 55 to engage over the free ends of the members 57 and hold the clutch engaged even though the force applied to the sleeve 53 in shifting it from its neutral intermediate position to its engaged position is removed. The clutch is, therefore, said to be self-locking or holding.

In the embodiment of the invention shown, the sleeve 53 of the clutch V is adapted to be shifted from its disengaged position to one or the other of its engaged positions and returned to disengaged position by a member 60 pivotally connected as by a pivot pin 61 to a suitable part of the frame of the machine or the gear box within which the speed change transmission J and the clutch V are housed. The member 60 includes a yoke member 62, the arms of which project to opposite sides of the sleeve member 53 and carry rollers that engage within a groove 63 in the sleeve member 53. In addition to the yoke member just referred to, the member 60 includes oppositely extending arms 64, 65 projecting at right angles to the yoke member 62.

The projecting ends of the arms 64, 65 are connected to armatures 66, 67 of electromagnetic solenoids 68, 69, respectively, by composite links comprising springs 70, 71, the upper ends of which are connected to yoke members 72, 73, respectively, the upwardly projecting, double arms of which yoke member are pivotally connected to the arms 64, 65 by pins 74, 75. The members 72, 73 include downwardly extending, threaded bosses 76, 77, respectively, and the upper ends of the springs are secured thereto by merely being threaded or screwed onto the bosses. The lower ends of the springs 70, 71 are pivotally connected to the armatures 66, 67 of the solenoids by yoke members 77, 78 similar to the yoke members 72, 73.

The springs 70, 71 are comparatively heavy and are of such a length and construction that when one of the solenoids, for example, the solenoid 69 is energized to shift the sleeve member 53 to engage the right-hand side of the clutch V, the spring elongates slightly allowing the armature of the solenoid to seat in the coil. When the solenoid is deenergized, the energy stored in the spring causes the relatively heavy armature to be rapidly pulled and accelerated toward the arm to which the opposite end of the spring is connected and as the spring collapses, it forms a sufficiently rigid column or link to cause a hammer blow effect to be produced at the end of the arm, which hammer blow shifts or assists in shifting the sleeve member 53 toward its neutral position. As soon as the sleeve 53 has been moved a sufficient distance to allow the free ends of the levers 57 to engage the cam surfaces 56, the natural tendency for the clutch to disengage continues or assists in continuing the movement of the sleeve 53 to neutral position. In the particular embodiment of the invention shown, the movement of the sleeve 53 to disengaged position is assisted, if necessary, by the opposite solenoid.

The energization of the solenoids 68, 69, as shown, is controlled by a push button switch 80 having normally closed and normally open contacts. The push button switch 80 replaces the rapid traverse push button switch 461 of the aforesaid patent and is located in the same position on the pendant control station H, which pendant control station also includes numerous other switches for controlling other operations of the machine, all of which, with the exception of two switches hereinafter specifically referred to, are the same as those shown and described in the aforesaid patent. The normally closed contacts of the switch 80 are in series circuit across the supply lines 82, 83 with the operating coil of a relay 81 provided with both normally open and normally closed contacts. The normally open contacts of the relay 81, which contacts are shown closed because the operating coil is energized, are in series circuit across the supply lines 82, 83 with the solenoid 69. As soon as the main power or line switch for the machine is closed, the relay 81 operates to close its normally open contacts and energize the solenoid 69 to engage the right-hand or feed side of the clutch V so that the feed is always connected except when the push button switch 80 is depressed to engage the left-hand or rapid traverse side of the clutch.

The normally open contacts of the switch 80 are in series circuit across the supply lines 82, 83 with the operating solenoid of a second relay 84. The normally closed contacts of relay 81, which contacts are shown open, are in series circuit across the supply lines 82, 83 with a normally open limit switch 85 now closed by the arm 65 since the solenoid 69 is energized, and the solenoid 68 the armature of which is connected to the arm 64. The normally open contacts of the relay 84 are connected in series circuit across the lines 82, 83 with the solenoid 68 in a manner similar to that in which the normally open contacts of relay 81 are connected in series circuit with the solenoid 69, and the normally closed contacts of relay 84 are connected in series circuit across the lines 82, 83 with the normally open limit switch 86 corresponding with the switch 85, and the solenoid 69. The limit switch 86 is adapted to be closed by the arm 64 when the member 60 is in position to engage the left-hand or rapid traverse side of the clutch V. The construction is such that upon deenergization of the operating coil of either of the relays 81, 84 and, in turn, the solenoid 68 or 69 associated therewith, the other solenoid, either 68 or 69 as the case may be, is energized until the then closed limit switch 85 or 86 is opened by return of the member 60 and the sleeve member 53 to its intermediate position with both sides of the clutch disengaged. This usually occurs momentarily upon deenergization of one or the other of the relays 81, 84.

By using tension springs in the manner contemplated by the present invention to connect the armatures of solenoids to mechanism to be moved thereby, it will be apparent that smaller and less powerful solenoids may be employed to perform a given operation than would otherwise be the case and that the noise is reduced because the armatures of the solenoids may bottom or abut against a fixed member such as the coils of the solenoids, thereby reducing vibration, etc. It will also be apparent that the solenoids need not be perfectly aligned with the parts connected to their armatures for best operation because slight variations in alingment will be taken care of by the springs. Smaller and less powerful solenoids may be employed because the reverse movement of the members shifted by the solenoids is effected or assisted by the hammer blow effect produced by the sudden release of the relatively heavy armature of the solenoid and the energy stored in the spring which connects the armature with the member, thus eliminating the necessity of having heavy or powerful springs to perform this function, the force of which springs must be overcome in moving the member to engaged or operative position. It will be apparent that in order to get the desired action from the springs 70, 71, the solenoids must be so constructed and located that they will stretch the springs an appreciable amount after the side of the clutch with which they are associated is engaged. The length of the links formed by the tension springs and their associated yoke members can be readily adjusted by screwing the spring further on or off one or both ends of the threaded studs to which the spring is connected. If desired, a jam nut can be placed between the end of the spring and the yoke member but this is ordinarily not required. As load is applied to the spring it tends to contract radially and more tightly grip the studs to which it is connected.

While a double acting, friction clutch of the self-locking type has been illustrated, it is to be understood that the invention is equally applicable to jaw type clutches and clutches which are not of the self-holding or locking type. The particular clutch shown can be readily converted to one of the non-self-holding or locking type by limiting the axial movement of the sleeve 53 to an amount less than that required to cause the lugs 55 to overlie the free ends of the levers 57. If desired, a light spring may be employed to center the shiftable clutch member and hold the clutch disengaged. This may be particularly desirable in the case of a jaw clutch so as to avoid any possibility of the jaws accidentally meshing due to vibration, etc. It is also to be understood that oscillating electromagnetic motors may be substituted for the reciprocating motors exemplified by the solenoids shown.

Figs. 5 and 6 show the invention applied to the shifting of a gear cluster in the speed change transmission of the spindle drive of the machine shown in Fig. 1. The spindle 19 of the machine is adapted to be rotated at various rates of speed by the motor 23 through the medium of a speed change transmission, designated generally by the reference character P, which transmission is housed in a suitable gear box 209 supported in the bed of the machine. The transmission P is connected to the spindle 19 by mechanism shown in the aforesaid patent, including the vertical shaft 210, the lower end of which is rotatably supported in the gear box and is connected to the output shaft 217 of the transmission P by miter gears 218, 219.

The driven shaft 211 of the transmission P is operatively connected to the motor 23 through the medium of a V-belt drive 212 and gears 213, 214, the latter of which is fixed to the shaft 211. The shaft 211 carries a three-gear cluster 220 slidably splined thereto, the three gears of which, designated 90, 91 and 92, are adapted to selectively engage gears 93, 94 and 95, respectively. The gear 93 is one of a two-gear cluster 223 fixed to a shaft 224 rotatably supported in the speed change gear box in the base of the machine, as are the other shafts of the gear box, and the gears 94, 95 are part of the three-gear cluster 222 also fixed to the shaft 224. The splined shaft 217 carries a three-gear cluster 221 slidably splined thereon, the gears 96, 97, 98 of which are adapted to selectively mesh with gears 100, 93, 101, respectively. The gear 100 forms a part of the two-gear cluster 223, and the gear 101 forms a part of the three-gear cluster 222 both of which gear clusters have been previously referred to.

Different speeds can be obtained by moving or shifting the gear clusters 220 and 221 to different positions. According to the provisions of the present invention, the various positions of the gear clusters 220 and 221 are controlled by electric means from a remote point. As shown, the position of the gear clusters is controlled by electric switches 105, 106 located on the right-hand side of the pendant control station H which includes numerous other switches for controlling other operations of the machine. The mechanisms for shifting and/or controlling the positioning of the gear clusters 220 and 221 are identical and only the mechanism employed for shifting and/or controlling the positioning of gear cluster 221 is shown in the drawings and will be herein described.

The yoke member 226 through the medium of which the gear cluster 221 is moved or maintained in any position, is carried by a rod 107 slidably supported in the speed change gear box 209. The rod 107 and the yoke member 226 are continuously urged to a position where the gears 93, 97 of the clusters 223 and 221, respectively, are in mesh, which position will be hereinafter referred to as the intermediate position, by compression springs 110, 111 surrounding the rod 107 and engaging opposite sides of the yoke member 226 and the sides of the gear box 209. Alternatively the intermediate position may be a neutral disengaged position, and/or other suitable abutments may be provided for the springs 110, 111. The rod 107 is adapted to be shifted or moved toward the right, as viewed in Fig. 5, to disengage the gears 93, 97 and engage the gears 98, 101 by an electromagnetic solenoid 112 which, when energized, pulls the rod 107 toward the right. In like manner, the rod 107 is pulled toward the left to disengage the gears 93, 97 and engage the gears 96, 100 by a similar solenoid 113. In the embodiment shown, the solenoids 112, 113 are in axial alignment with the rod 107 and are connected thereto by springs 114, 115 similar to the springs 70, 71 previously referred to. The inner ends of the springs 114, 115 are connected to opposite ends of the rod 107 by being directly screwed upon the ends of the rod which are threaded. The opposite ends of the springs are pivotally connected to the armatures 116, 117 of the solenoids 112, 113 by yoke members 118, 119, respectively, similar to either of the yoke members 77, 78 previously referred to.

The solenoids 112, 113 are adapted to be selectively energized by the three position switch 105 located at the top of the right-hand side of the pendant control station H, see Fig. 6. When the switch 105 is in its intermediate position marked "2" in the drawings, that is, the position shown in the drawings, neither of the solenoids 112, 113 are energized, but when the switch 105 is turned to its right-hand position, that is, the position marked "3" in the drawings, a circuit is completed from the line 120 through the operating coil of relay 121 having both normally open and closed contacts, to the line 122. Energization of the operating coil of relay 121 closes the normally open contacts thereof, completing a circuit from the line 120 through the solenoid 112 to the line 122.

Energization of the relay 112 causes the armature 116 thereof to pull the rod 107 to the right disengaging the gears 93, 97 and engaging the gears 98, 101. Movement of the rod 107 toward the right is limited or stopped when the gears 98, 101 become fully engaged by the spring 111 which becomes fully compressed when the gears 98, 101 are properly meshed. The spring 114 elongates and the armature 116 continues to move, however, until the armature bottoms in the coil of the solenoid 112 or abuts against some other suitable fixed stop. When the solenoid 112 is de-energized by movement of the switch 105 to one of its other positions, the spring 114 quickly pulls the relatively heavy armature 116 toward the rod 107 and when the spring collapses, the armature strikes the end of the rod a hammer blow through the spring which then forms a solid link or column. The hammer blow effect produced on the end of the rod 107 releases the gears if they tend to stick in mesh because of some load remaining thereon, etc., and shifts or assists in shifting the gears into another position. Another advantage of using springs of the character contemplated to shift gears, jaw type clutches, etc., resides in the fact that if the teeth are aligned and will not go in mesh, the spring will merely elongate keeping tension on the member and when relative rotation takes place between the toothed members, as upon the starting of the motor associated therewith, the teeth will pull into mesh.

When the switch 105 is turned to its left-hand position, that is, to the position marked "1" in the drawings, the solenoid 113 will be energized through a relay 123 in a manner similar to that in which the solenoid 112 is energized when the switch 105 is in its right-hand or No. 3 position. Energization of the relay 113 causes its armature 117 to pull the rod 107 to the left through the spring 115 to engage the gears 96, 100. Movement of the rod 107 to the left past a position where the gears 96, 100 are properly meshed is limited or prevented by the spring 110 which collapses to form a positive stop when the gears are meshed. Continued movement of the armature 117 to the left after further movement of the rod 107 is impossible elongates the spring 115. The solenoid 113, like the other solenoids, is preferably so constructed that the armature 117 will bottom in the coil of the solenoid or abut some other suitable fixed stop. As previously stated, the solenoids must be so constructed and located that when their armatures reach the limit of their travel upon energization of the solenoids, the springs associated therewith must be stretched an appreciable amount to obtain the desired spring action or hammer effect upon deenergization of the solenoids.

Like the embodiment of the invention shown in Fig. 2, the present embodiment utilizes the deenergized solenoid to assist, if necessary, in the disengagement of the engaged gears and the return of the gear cluster to its intermediate position upon deenergization of one or the other of the solenoids 112, 113. This is accomplished by the use of normally open limit switches 124, 125 adapted to be closed by a projection on the yoke member 226 when the rod 107 is shifted to the right or left, respectively. The switch 124 is in series circuit across the supply lines 120, 122 with the normally closed contacts of relay 121 and solenoid 113. The arrangement is such that upon the deenergization of the operating coil of relay 121 and in turn the solenoid 112, the normally closed contacts of relay 121 close establishing a circuit through solenoid 113 until the yoke member 226 has moved to the left a sufficient distance to allow the switch 124 to open, which distance is preferably that required to disengage the gears 98, 101. The switch 125 is connected in series circuit with the normally closed contacts of relay 123 and solenoid 112 and operates to energize solenoid 112 until the gears 96, 100 are disengaged upon deenergization of the solenoid 113. The springs 110, 111 are comparatively light and do not materially interfere with the action of the solenoids 112, 113, etc., and are preferably only of sufficient strength to return the gear cluster to its normally intermediate position shown in the drawings when neither the gears 96, 100 or the gears 98, 101 are engaged; however, the springs may be of greater strength, if desired.

From the foregoing description of the preferred embodiments of the invention, it will be apparent that the objects heretofore enumerated and others have been accomplished and that a novel and improved mechanism including solenoids has been provided for moving a member such as the movable element of a clutch or speed change transmission and that there has been provided a novel and improved machine tool, particularly a horizontal boring machine comprising remote control mechanism including a solenoid for shifting various machine elements thereof, such as change gears, clutches and the like. While the preferred embodiments of the invention have been described with considerable detail, I do not wish to be limited to the particular construction shown which may be varied within the scope of this invention. It is my intention to cover hereby all adaptations, modifications and uses thereof which come within the practice of those skilled in the art to which the present invention relates.

Having thus described my invention, I claim:

1. In a machine tool or the like having a selective drive mechanism including an operating member shiftable to and from a predetermined position, mechanism to shift said member comprising in combination, electromagnetic means including an element movable to one position in response to energization of said means, and a normally collapsed tubular coil spring interconnecting said member and element, the length of said spring and the travel of said element being such that when said member is in said predetermined position and said means is deenergized said spring is collapsed with the convolutions engaging one another and forming a substantially non-compressible thrust member between said element and member and when said means is energized said spring is stretched to urge said member to said predetermined position, whereby upon deenergization of said means said spring collapses and draws said element thereagainst and transmits the kinetic energy of said element therethrough to said member to tend to shift said member from said predetermined position.

2. In a machine tool or the like having a selective drive mechanism including an operating member shiftable to and from a predetermined position and tending to remain in said position, mechanism to shift said member comprising in combination, a solenoid, an armature associated with said solenoid and movable to one position in response to energization of said solenoid, and a normally collapsed tubular coil spring interconnecting said member and armature, the length of said spring and the travel of said armature being such that when said member is in said position and said solenoid is deenergized said spring is collapsed with the convolutions engaging one another and forming a substantially non-compressible thrust member between said armature and member and when said solenoid is energized said spring is stretched to urge said member to said predetermined position, whereby upon deenergization of said solenoid said spring collapses and draws said armature thereagainst and transmits the kinetic energy of said armature to said member to tend to shift said member from said predetermined position.

3. In a machine tool or the like having a selective drive mechanism including an operating member shiftable between two predetermined positions, mechanism for shifting said operating member from one position to the other comprising a pair of electromagnetic means each including an element movable to one position in response to energization of the respective means, and a pair of means interconnecting said operating member and said elements respectively, one of said pair of means being resiliently flexed when the element connected therewith is moved to its one position to urge said operating member to one of said predetermined positions and when said one electromagnetic means is deenergized said one of said pair of said means snap moves the last mentioned element thereagainst and forms a substantially non-compressible thrust column which transmits the kinetic energy of said last mentioned element therethrough to said member to tend to move said member from said one predetermined position, and when the other of said electromagnetic means is energized the element associated therewith is moved to its one position and resiliently flexes the other of said pair of means to resiliently urge said operating member to the other of said predetermined positions and when said other electromagnetic means is deenergized said other of said pair of means snap moves the last mentioned element thereagainst and forms a substantially non-compressible thrust column which transmits the kinetic energy of the last mentioned element therethrough to said member to tend to move said member from said other predetermined position.

4. In a machine tool or the like having a selective drive mechanism including an operating member shiftable between two predetermined positions, mechanism for shifting said operating member from one position to the other comprising a pair of electromagnetic means each including an element movable to one position in response to energization of the respective means, and a pair of normally collapsed tubular coil springs acting as substantially non-compressible thrust members when collapsed interconnecting said operating member and said elements respectively, the length of said springs and the travel of said elements being such that when one of said means is energized the element thereof is moved to its one position and stretches the spring connected therewith to urge said operating member to one of said predetermined positions and when said one means is deenergized said spring collapses and snap moves the last mentioned element thereagainst and transmits the kinetic energy of said last mentioned element therethrough to said member to tend to move said member from said one predetermined position, and when the other of said means is energized the element associated therewith is moved to its one position and stretches the spring attached thereto to resiliently urge said operating member to the other of said predetermined positions and when said other means is deenergized the last mentioned spring collapses and snap moves the last mentioned element thereagainst and transmits the kinetic energy of the last mentioned element therethrough to said member to tend to move said member from said other predetermined position.

5. In a machine tool or the like having a selective drive mechanism including an operating member shiftable between two predetermined positions and tending to remain in said positions, mechanism for shifting said operating member from one position to the other comprising a pair of solenoids, an armature associated with each of the respective solenoids and movable to one position in response to energization of the respective solenoids, and a pair of normally collapsed tubular coil springs acting as substantially non-compressible thrust members when collapsed interconnecting said operating member and said armatures respectively, the length of said springs and the travel of said armatures being such that when one of said solenoids is energized the armature associated therewith is moved to its one position and stretches the spring connected therewith to urge said operating member to one of said predetermined positions and when said one solenoid is deenergized said spring collapses and snap moves the last mentioned armature thereagainst and transmits the kinetic energy of said armature therethrough to said member to tend to move said member from said one predetermined position, and when the other of said solenoids is energized the armature associated therewith is moved to its one position and stretches the spring attached thereto to resiliently urge said operating member to the other of said predetermined positions and when said other solenoid is deenergized the last mentioned spring collapses and snap moves the last mentioned armature thereagainst and transmits the kinetic energy of the last mentioned armature therethrough to said member to tend to move said member from said other predetermined position.

6. In a machine tool or the like having a selective drive mechanism including an operating member shiftable to and from a predetermined position, mechanism to shift said member comprising in combination, electromagnetic means including an element movable to one position in response to energization of said means, and an extendable spring interconnecting said member and element, the length of said spring and the travel of said element being such that when said member is in said predetermined position and said means is deenergized said spring is collapsed with adjacent segments engaging one another and forming a substantially non-compressible thrust member between said element and member and when said means is energized said spring is stretched to urge said member to said predetermined position, whereby upon deenergization of said means said spring collapses and draws said element thereagainst and transmits the kinetic energy of said element therethrough to said member to tend to shift said member from said predetermined position.

HALLIS N. STEPHAN.

REFERENCES CITED

The following references are of record in the file of this patent:

UNITED STATES PATENTS

| Number | Name | Date |
|---|---|---|
| 1,264,414 | Mahoney | Apr. 30, 1918 |
| 1,720,989 | Ahlm | July 16, 1929 |
| 1,814,424 | Barr | July 14, 1931 |
| 1,891,678 | Maybach | Dec. 20, 1932 |
| 2,176,381 | Shaw | Oct. 17, 1939 |
| 2,310,878 | Stephan | Feb. 9, 1943 |
| 2,384,448 | Banker | Sept. 11, 1945 |
| 2,391,123 | Carliss | Dec. 18, 1945 |
| 2,450,049 | Kommer | Sept. 28, 1948 |
| 2,501,298 | Winchell | Mar. 21, 1950 |

FOREIGN PATENTS

| Number | Country | Date |
|---|---|---|
| 31,663 | Netherlands | Dec. 15, 1933 |
| 94,131 | Sweden | Jan. 13, 1939 |
| 656,791 | Germany | Feb. 18, 1938 |